(12) United States Patent
Crittenden

(10) Patent No.: US 9,493,980 B1
(45) Date of Patent: Nov. 15, 2016

(54) STILE AND RAIL DOOR WITH HOLLOW CORE STILES AND RAILS FOR PERIMETER AIR FLOW

(71) Applicant: Jerry G. Crittenden, Phoenix, AZ (US)

(72) Inventor: Jerry G. Crittenden, Phoenix, AZ (US)

( * ) Notice: Subject to any disclaimer, the term of this patent is extended or adjusted under 35 U.S.C. 154(b) by 0 days.

(21) Appl. No.: 14/999,148

(22) Filed: Apr. 1, 2016

Related U.S. Application Data

(63) Continuation-in-part of application No. 14/756,033, filed on Jul. 23, 2015, which is a continuation-in-part of application No. 14/756,017, filed on Jul. 21, 2015, which is a continuation-in-part of application No. 14/120,870, filed on Jul. 7, 2014, now Pat. No. 9,109,389, which is a continuation-in-part of application No. 12/927,766, filed on Nov. 23, 2010, now Pat. No. 9,085,933.

(51) Int. Cl.
| | |
|---|---|
| *E06B 3/70* | (2006.01) |
| *E06B 7/10* | (2006.01) |
| *E06B 5/00* | (2006.01) |
| *E06B 7/02* | (2006.01) |

(52) U.S. Cl.
CPC . *E06B 7/10* (2013.01); *E06B 3/70* (2013.01); *E06B 5/00* (2013.01); *E06B 2003/7094* (2013.01); *E06B 2007/026* (2013.01)

(58) Field of Classification Search
CPC .............. E06B 7/10; E06B 3/70; E06B 5/00; E06B 2003/7094; E06B 2007/026
USPC ............................ 454/195, 237, 238; 52/455
See application file for complete search history.

(56) References Cited

U.S. PATENT DOCUMENTS

| | | | | |
|---|---|---|---|---|
| 65,451 | A * | 6/1867 | Timby | E06B 7/02 454/195 |
| 1,107,369 | A * | 8/1914 | Shelton | E06B 3/5892 454/195 |
| 1,427,282 | A * | 8/1922 | Gervais | E06B 5/16 52/302.1 |
| 2,034,723 | A * | 3/1936 | Fitch | B60J 5/0497 105/409 |
| 2,308,262 | A * | 1/1943 | Beil | F24F 13/18 454/195 |
| 2,328,761 | A * | 9/1943 | Wamnes | E06B 7/02 454/195 |
| 2,620,521 | A * | 12/1952 | Fleet | E06B 3/825 52/455 |

(Continued)

FOREIGN PATENT DOCUMENTS

| | | | | |
|---|---|---|---|---|
| CN | 203783390 U | * | 8/2014 | |
| DE | 3802583 A1 | * | 8/1989 | ............ E06B 7/10 |

(Continued)

*Primary Examiner* — Steven B McAllister
*Assistant Examiner* — Frances F Hamilton
(74) *Attorney, Agent, or Firm* — H. Gordon Shields

(57) ABSTRACT

Stile and rail door apparatus for preventing the build up of pressure in a room having a register for a forced air system through which air flows into the room includes hollow core stiles and rails and which hollow cores define a chamber and a panel having an outer periphery secured to spacers to secure the outer periphery of the panel within chamber to provide a perimeter air flow about the panel. Air flow from the room is through the door by flowing into the chamber and about the outer periphery of the panel and outwardly from the chamber and outwardly from the room in a non linear manner.

20 Claims, 9 Drawing Sheets

(56) References Cited

U.S. PATENT DOCUMENTS

| | | | | |
|---|---|---|---|---|
| 2,704,504 A | * | 3/1955 | Wilkening | E06B 7/02 181/224 |
| 2,823,429 A | * | 2/1958 | Grant | E06B 1/52 454/195 |
| 2,948,366 A | * | 8/1960 | Kelly | E06B 3/822 49/399 |
| 3,295,273 A | * | 1/1967 | Wehe, Jr. | E06B 3/822 181/292 |
| 3,963,094 A | * | 6/1976 | Nowikas | E04B 1/8218 181/198 |
| 3,982,475 A | * | 9/1976 | Wild | F24F 13/24 454/185 |
| 4,433,985 A | * | 2/1984 | McGee | A62B 5/00 169/54 |
| 4,901,493 A | * | 2/1990 | Thorn | E06B 3/7001 52/309.9 |
| 5,016,526 A | * | 5/1991 | Dallaire | E06B 7/10 118/723 R |
| 5,120,273 A | * | 6/1992 | Lin | E06B 7/02 454/195 |
| 5,584,760 A | * | 12/1996 | Green | F24F 13/18 454/195 |
| 5,782,546 A | * | 7/1998 | Iwatare | H05K 9/0041 312/236 |
| 5,902,026 A | * | 5/1999 | Swan | E06B 3/5892 312/138.1 |
| 8,336,672 B2 | * | 12/2012 | Derks | F16L 55/033 181/224 |
| 8,898,973 B2 | * | 12/2014 | Miller | E06B 7/02 52/209 |
| 2006/0270334 A1 | * | 11/2006 | Kim | E06B 7/10 454/200 |
| 2011/0175504 A1 | * | 7/2011 | Cook | H05K 7/20572 312/236 |

FOREIGN PATENT DOCUMENTS

| | | | | |
|---|---|---|---|---|
| FR | EP 0427652 A1 | * | 5/1991 | E06B 3/308 |
| FR | 2672336 A1 | * | 8/1992 | E06B 3/677 |

* cited by examiner

STILE AND RAIL DOOR WITH HOLLOW CORE STILES AND RAILS FOR PERIMETER AIR FLOW

CROSS REFERENCE TO RELATED APPLICATIONS

THIS APPLICATION IS A CONTINUATION IN PART APPLICATION OF application Ser. No. 14/756,033, FILED Jul. 23, 2015, AND OF application Ser. No. 14/756,017, FILED Jul. 21, 2015, BOTH OF WHICH APPLICATIONS WERE CONTINUATION IN PART APPLICATIONS OF application Ser. No. 14/120,870, FILED Jul. 7, 2014, NOW U.S. Pat. No. 9,109,389, DATED Aug. 18, 2015, AND WHICH WAS A CONTINUATION IN PART OF application Ser. No. 12/927,766, FILED Nov. 23, 2010, NOW U.S. Pat. No. 9,085,933, DATED Jul. 21, 2015.

STATEMENT REGARDING FEDERALLY SPONSORED RESEARCH OR DEVELOPMENT

NOT APPLICABLE

INTRODUCTION

As noted above, the invention described and claimed herein is descended from several prior applications, and pertinent portions of those applications, both drawing figures and descriptive material, are included herein. While original drawing figures are included herein, with their original reference numerals, and their original descriptive material, the drawing figures follow consecutively in the present application. Drawing FIGS. 1-6 of the ultimate parent application, now the '933 patent, and their descriptive material, are as found in the '933 patent, the remaining drawing figures are numbered consecutively for the purposes of the present application, but the reference numbers and descriptive material are as found in their respective parent applications.

BACKGROUND OF THE INVENTION

Field of the Invention

This invention pertains to doors, and, more particularly, to doors having internal openings through which air flows non linearly for preventing air pressure from building up in closed rooms.

Description of the Prior Art

Hollow core doors have been made for many years for inside doors. The hollow core doors are less expensive than conventional stile and rail doors, are easier to manufacture, and they are rigid and hence resist warping and twisting. Such hollow core doors make up the largest share of inside doors where strength and security are not required.

A hollow core door generally includes a perimeter frame of a pair of vertically extending stiles and a pair of horizontally extending rails. The perimeter frame is covered typically with plywood panels or skins adhesively secured to the perimeter frame. There are also inside frame elements, typically wood strips extending horizontally between vertical frame members or in an "x" configuration within the perimeter frame.

With the advent of cheaper materials, such as hardboard and medium density fiberboard (mdf) to replace the plywood, the construction of doors became less expensive to manufacture using the cheaper materials than the manufacture of doors using the more expensive plywood panels or skins. However, the use of hardboard and mdf also requires a binder, and the most commonly used binder is a urea formaldehyde resin or compound. In other words, the substances out of which panels or skins for hollow core doors are made inherently include, under contemporary manufacturing processes, at least a single noxious material.

The use of urea formaldehyde contributes to what is sometimes referred to as "Sick Building Syndrome." This syndrome is caused by the gas emissions from the formaldehyde and from other chemicals used in the new door products and from other products in the home that also use formaldehyde resin or binder, such as furniture, kitchen cabinets, wood flooring, counter tops, wallpaper, carpet, and even paint.

There may also be other factors contributing to the Sick Building Syndrome, such as poor ventilation, combustion gases, fumes from attached garages, high auto traffic, tobacco smoke, and various volatile organic chemicals or VOCs. However, formaldehyde compounds or products probably contribute most to the Sick Building Syndrome and to the discomfort of people in the building or structure.

One solution, or partial solution, to the syndrome is to reduce the use of formaldehyde products. Another solution is to provide a product or products that absorbs and decomposes the formaldehyde gases and other noxious gases or products. The present invention includes absorbent material which absorbs and decomposes formaldehyde gases and other noxious materials and removes them from within the hollow core door and from air passing through the hollow core of a door to help clean the air within the room and building in which the door is located.

Moreover, the use of several doors in a house or building, such as one or more doors in each room, provides sufficient area on which is disposed the absorbent material for cleaning or scrubbing the air flowing through the doors. It is noted that typically each room in a house has at least one door, and rooms may have more than one door when closet doors, etc., are taken into consideration. The more doors in a home or building, the more efficient the scrubbing or cleaning process becomes.

It is also noted that in the case of new construction, doors are usually installed towards the end of the construction period, but prior to occupancy. It is important to clean the air of all the noxious material occasioned by the construction, such as paints, adhesives, tobacco smoke, new furniture, etc., prior to occupancy. The use of fans to change the air after construction and prior to occupancy may remove much of the noxious materials, but VOCs and adhesive gases may continue to outflow from their sources for a substantial period of time after construction and after occupancy. The present invention helps to remove those noxious materials from the air on a continuing, long term basis.

Hollow core doors also have an advantage in that the hollow core is ideal for including pressure equalization elements to prevent air pressure from building up within a closed room. Such air pressure build up in a room interferes with the proper circulation of heated or cooled air in a forced air system.

Typically, there are no cost effective ways to prevent the increase in pressure in a closed room relative to a return air space. The return air space in a house is usually a hall which has a return air duct which conveys return air back to an air handler.

Embodiments of hollow core doors of the present invention overcome the problem of preventing pressure build up in a room and at the same time provide substantial privacy relative to both light and sound. Moreover, the air scrubbing and pressure build up structures may be combined to provide a "smart door" That performs both a scrubbing function and a pressure build up prevention function.

Hollow core doors may also include a safety function when a pressure build up function is combined with a sensor to detect fire, smoke, carbon monoxide, etc., and then close off air flow through the door to provide a extra times for residents to evacuate the room, or to help isolate a sick or ill person from spreading contaminated air. A hollow core door with build up prevention function may add a movable panel with openings that match openings in a fixed panel or pair of fixed panels in order to prevent air flow through the door in case of need. The door then is better at retarding fire and smoke than an ordinary or standard interior hollow core door. An actuator may slide the movable panel to vary the alignment of openings in the fixed panel(s) in response to an appropriate signal from the sensor.

The air pressure build up prevention may also be applied to stile and rail doors. The present invention utilizes a frame with hollow core stiles and rails and one or more solid panels disposed within the frame to provide the ability to prevent pressure build up in a room with a forced air system. The air flow is about the perimeter of a panel, or multiple panels, to prevent pressure build up in the room. Scavenging materials and "smart door" functions may also be incorporated in the construction of such door.

SUMMARY

The invention described and claimed herein includes an interior door with a center panel secured to an outer frame for a closed room with a forced air system. The frame is a stile and rail door frame in which the stiles and rails are hollow core stiles and rails to provide for the non linear flow of air around a solid panel core. The hollow core stiles and rail frame may include more than a single panel, and the panels are appropriately secured to support elements for the flow of air about the perimeter of the several panels in the frame. The spacing of the center panel or panels from, or within, the hollow core stiles and rails (and horizontal supports or intermediate rails for multiple panels), provide a non linear flow of air through the door to prevent a build up of pressure in a closed room to which the door is secured. The flow of air around the panel(s) provides greater area for the flow of air than the area of an inflow vent so that there is no build up of pressure in the room. "Smart door" sensor and transmitter elements may be incorporated into the stile and rail frame.

Among the objects of the present invention are the following:

To provide a new and useful stile and rail door;

To provide a new and useful door having elements to prevent pressure built up in a closed room having a forced air system;

To provide a new and useful hollow core door having air flow through the door of a predetermined amount equal to or greater than the air flow into the room from an air supply register to prevent the build up of pressure within a closed room;

To provide a new and useful stile and rail door having a center panel secured to the stile and rail frame and about which center panel air flows in a nonlinear manner;

To provide a new and useful stile and rail door having a fixed center panel secured to the stile and rail outer frame and which center panel is spaced apart from a hollow core stile and rail door frame for allowing a flow of air through the door and about the center panel in a nonlinear manner;

To provide a new and useful stile and rail frame for a center panel secured within the frame and about which center panel the air flows in a nonlinear manner;

To provide a new and useful outer frame for a stile and rail door in which the stiles and rails are hollow and in which hollow stile and rail frame a center panel is secured;

To provide a new and useful hollow core stile and rail door having a fixed center panel disposed within the hollow stiles and rails and about which center panel air flows through the door in a nonlinear manner to prevent pressure build up in a closed room;

To provide a new and useful hollow core stile and rail door having a center panel disposed within the hollow core stiles and rails by spacers to allow air flow around the perimeter of the center panel;

To provide a new and useful hollow core stile and rail door having sensors for sensing desired information and for providing outputs in response to the sensed information;

To provide a new and useful hollow core stile and rail door having at least a single panel secured to the hollow core stiles and rails and about which air flows through the door and having material about the panel for scavenging noxious materials from air flowing about the panel;

To provide a stile and rail door having a pair of spaced apart stiles and a top and a bottom and an intermediate rail spaced apart and secured to the spaced apart stiles, and the stiles and rails have hollow portions in which are secured panels and about which panels air flows through the door;

To provide a new and useful hollow core door apparatus for preventing a build up of pressure in a closed room having a forced air system by flowing air through a door to a return air space;

To provide new and useful door apparatus combining an air flow through the door for removing noxious materials from the air flow and for preventing a pressure build up in a closed room by flowing air non linearly through the door to a return air space; and To provide new and useful stile and rail door for preventing a build up of pressure in a closed room having a forced air system.

DESCRIPTION OF THE PREFERRED EMBODIMENT

Figure 1:
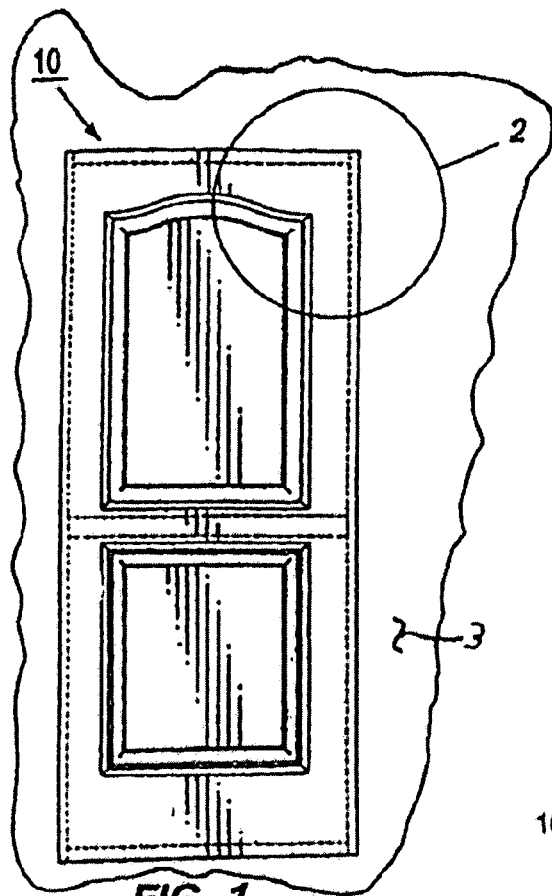
FIG. 1 is a schematic representation of a door of the present invention in its use environment.
Figure 2:
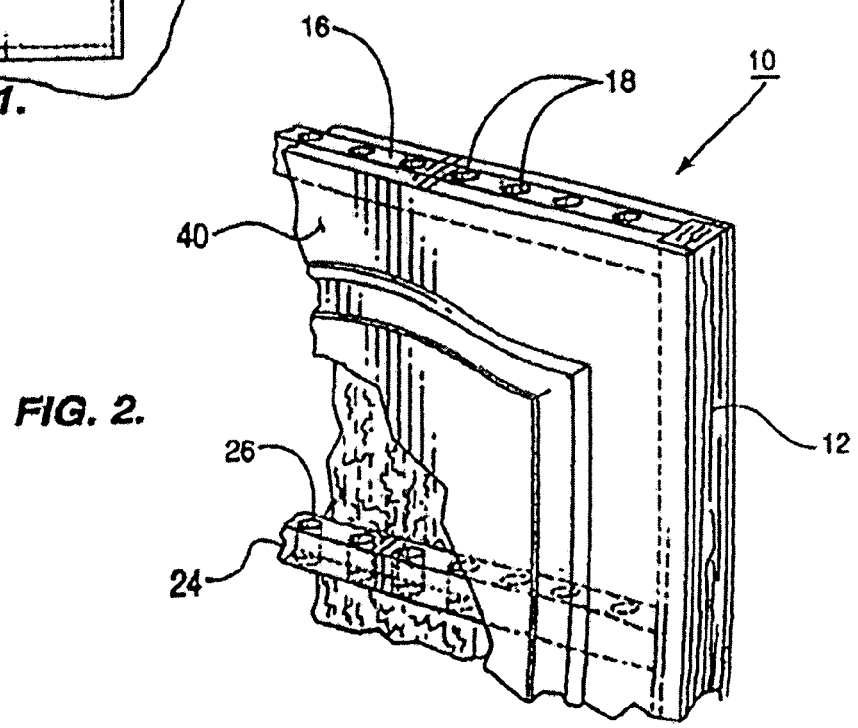
FIG. 2 is a perspective view of a portion of the door of FIG. 1 partially broken away, taken generally from circle 2 of FIG. 1.

FIG. 1 is a schematic representation of a view of a hollow core door 10 having scrubbing or scavenging capabilities for the removal of noxious materials from air flow through a door. The door 10 is disposed in a room 3. The room 3 is the use environment of the door 10. The door 10 includes a top panel 12 (see FIG. 2) secured to a perimeter frame Elements of the perimeter frame and portions of internal elements are shown in FIG. 2. FIG. 2 comprises a perspective view of a portion of the door 10 of FIG. 1, taken generally from circle 2 of FIG. 1. A portion of a side stile 12 is shown, along with a portion of a top rail 16, and a top cover or panel 40. The top rail 16 includes a plurality of openings or holes 18 through which air flows vertically within the door 10. Also shown in FIG. 2 is a portion of an upper internal brace element 24. The element 24 includes a plurality of spaced apart holes or openings 26 through which air may flow.

Figure 3:
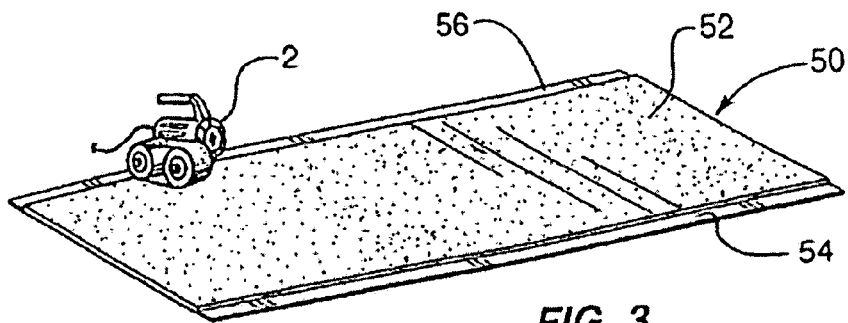
FIGS. 3, 4, and 5 are perspective views sequentially illustrating the manufacture of a hollow core door.
Figure 4:
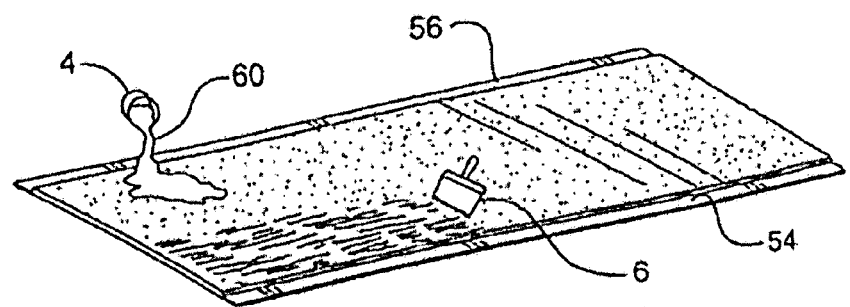
Figure 5:
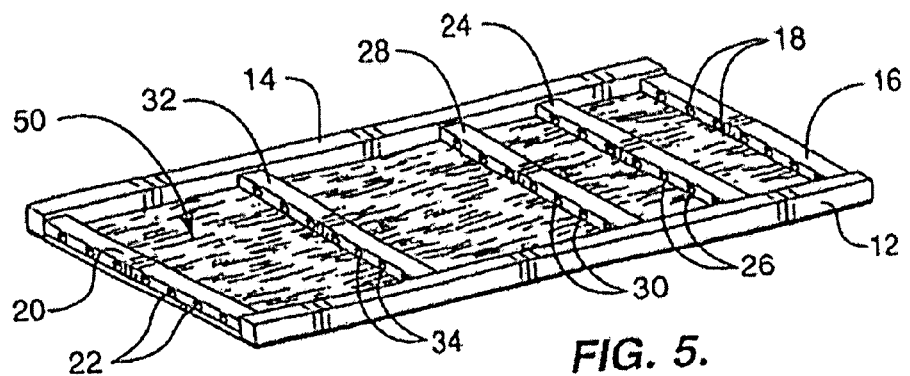
Figure 6:
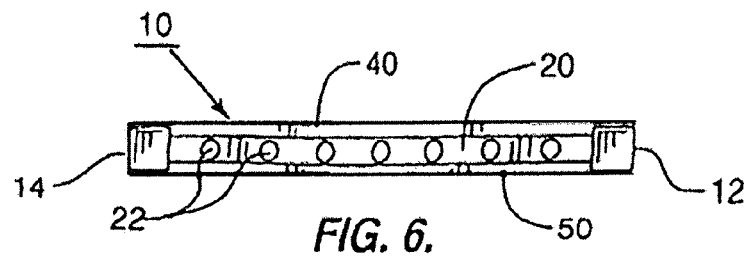
FIG. 6 is an end view of the door of FIGS. 1-5.

The door 10 and a method of making the door is illustrated in FIGS. 3, 4, and 5. FIGS. 3, 4, and 5 are consecutive or sequential perspective views illustrating the steps used to make the door 10. FIG. 5 also illustrates the internal bracing of the door 10. FIG. 6 is an end view of the completed door 10. For the following discussion, reference will be primarily directed to FIGS. 3, 4, 5, and 6.

A central portion 52 of an outer door panel or skin 50 may be rough sanded by a belt sander 2 after parallel rabbets 54 and 56 are machined into the panel 50. Obviously, an automatic sanding machine, not shown, may be preferable to the hand operated belt sander 2 shown in FIG. 3 if such sanding is deemed desirable. The purpose of the sanding is to acquire better adhesion of the absorbent material to the panels of the door. Other methods may also be used, such as paint or other adhesive.

The stiles 12 and 14 extend into the rabbets 54 and 56, as best shown in FIG. 6, when the outer panels are ready to be secured to the perimeter frame and to any internal frame elements.

After the rough sanding or sealing of the panel, an absorbent, such as diatomaceous earth, is applied to the rough sanded portion 52 of the panel 50. In FIG. 4, the absorbent material is schematically represented by reference numeral 60 being applied from a can or cup 4 or other desired element to form a layer on the sanded portion 52 of the panel 50.

It will also be noted that paper impregnated with an absorbent material may also be adhesively secured to the panel portion 52. Paper strips are sometimes adhesively secured to the inside portions of the outer panels or skins to provide stiffness. The strips may be impregnated with an absorbent, as noted.

The layer 60 is a special absorbent material which also may include an appropriate binder to secure the adhesion of the absorbent material to the panel 50. A water based paint may be used if desired. A scraper or trowel 6 is shown in FIG. 4 as smoothing the layer of absorbent material 60 on the panel 50 to insure an even coating on the panel.

It will be noted that any appropriate method of applying the absorbent material may be used. For example, rollering, spraying, troweling, etc., may be desired under various circumstances, such as when automating the process, or when a particular type of absorbent material used, etc.

Absorbent materials, such as diatomaceous earth and other materials which may also contribute to the absorption and decomposition of formaldehyde and noxious material may be includes in the absorbent material layer 60. A benefit of using diatomaceous earth, in addition to its absorbent capability, is the destruction of noxious insects. It is well known that insects which eat diatomaceous earth die of dehydration. Thus, the absorbent material layer 60 provides a pest control service, in addition to the absorption and decomposition of formaldehyde gases and tobacco smoke ingredients, and other noxious gases.

Other materials such as gypsum, sodium sulfate, manganese dioxide, aluminum oxide, titanium dioxide, potassium permanganate, tourmaline, various types of carbon or charcoal, and other materials currently being used or being developed, may also be included or used as or in the absorbent material layer 60.

Furthermore, the use of nano scale materials may also be used to scrub noxious materials, such as volatile organic chemicals (VOCs), from air. Nano scale materials, such as the tourmaline referred to in the preceding paragraph, are being developed for scrubbing noxious materials from air, but at the present time the use of such technology is in it infancy. In the future, such materials may be advantageous for use with the structure set forth herein.

The steps illustrated in FIGS. 3 and 4 are accomplished on the inner surfaces of both panels 40 and 50. Sequentially, after both panels have received the absorbent or scrubber material, the panels are secured to the perimeter frame and to the internal bracing or core. For example, in FIG. 5 the bottom panel 50 is shown secured to the stiles 12 and 14 and to the rails 16 and 20. Both rails 16 and 20 include the holes or apertures 18 and 22, respectively. Internal horizontal bracing or core elements 24, 28, and 32 are secured to the panel 50 and to the stiles 12 and 14. The elements 24, 28, and 32 each have a plurality of holes or apertures 26, 30, and 34, respectively, to allow for the flow or air continuing through the core of the door 10.

FIG. 6, an end view of the door 10, shows the stiles 12 and 14 and the bottom rail 20 with is apertures 22, and the panels 40 and 50. Note that the panels 40 and 50 have been arbitrarily been designated "top" and "bottom" for convenience. The "top" panel 40 is also designated as the "front" panel, above.

The steps illustrated in FIGS. 3 and 4 are repeated for the top panel 40, and the panel 40 is then secured to the perimeter frame and to the core elements.

Referring again primarily to FIGS. 2, 5, and 6, the top and bottom rails show openings or holes 18 and 22, respectively. If only formaldehyde gases or other noxious materials within an mdf door or the like were considered, such openings or holes in the rails may be eliminated. With absorbent material, such as diatomaceous earth, within the core, the formaldehyde products would be absorbed and decomposed. Holes or openings may still be located within internal bracing elements, if desired. However, the internal bracing elements may also be without holes if the internal absorbent is located similarly to that shown in FIG. 5. Obviously, the location and quantity of the absorbent material will be as appropriate for a particular door.

Moreover, if absorbent and decomposing materials, such as diatomaceous earth and gypsum, etc., are incorporated into the construction of the mdf or similar material, then such materials need not be added to the inside of the panels themselves. Rather, the addition of the scrubbing materials to the mdf or similar material in the making of the panels simplifies the scrubbing situation.

However, the inclusion of the scrubbing materials into the panels may not be sufficient if the filtering or scrubbing of an air flow through a hollow core door is desired. In such case, the addition of scrubbing material or materials within the hollow core as described above is desirable.

While diatomaceous earth and other materials have been mentioned or discussed above as appropriate absorbent materials for formaldehyde and other noxious material in the gases in the air flowing through the hollow core of a door, there are other appropriate absorbent or decomposing materials, such as activated carbon or charcoal, with appropriate additives, and other materials which also may be used for absorbing and decomposing formaldehyde and other noxious gases in the air flowing through the internal core of the hollow doors discussed above. And in the future there will undoubtedly be other materials to perform the same basic scrubbing functions.

Moreover, one panel, a top panel for example, may use one type of absorbent or decomposing material, while the other panel, a bottom panel, may use another type of absorbent or decomposing material. Or several types of such materials may be used on each panel. The use of a particular one or more materials may depend on the particular situations or locations for or at which the doors are made or are installed. The removal of noxious materials from air flowing through the hollow core of a door may include different types of absorbent or decomposing or other products. Noxious material may take the form of compounds, odors, moisture, etc., and combinations of such things.

The removal of such noxious material may require absorption, decomposition, or other technique—chemical, mechanical, etc. The flow of air in a structure and through the hollow core of a door carries the noxious material, and the removal of the noxious material may require a combination of products, techniques, etc.

It will be noted that the term "gases" is to be broadly construed and includes water vapor or moisture in the air, as well as odoriferous gases, and other noxious materials or compounds in the air within a structure. The term "gases" is thus not limited to formaldehyde or similar gases.

It will also be noted that doors made out of mdf products have been discussed and illustrated because of the use of formaldehyde resin or binders commonly used in the manufacture of mdf products, and formaldehyde is probably the leading noxious material. However, a hollow core door made of steel, fiberglass, wood, or other products, may also be used with absorbent, decomposing, etc., material within the hollow core for removing or neutralizing noxious material or products or gases from air flowing through the hollow core. The scrubbing of noxious material from air flow accordingly may require a combination of materials secured within the hollow core of a door regardless of what the door is made of.

The terms "scrubber," "scrubbers," "scrubbing," and "scavenging" all refer generically to the various kinds or types of products which may be used to remove noxious materials from the internal air flow within the core of a door.

It will further be noted that as used herein, and in the claims, the terms "material" and "materials" are virtually interchangeable, with "material" being considered both, or either, singular or plural.

The terms "absorb" and "absorbent," etc., have been used herein regarding appropriate materials for carrying out the purposes of the present invention. It will be understood that "adsorb" and "adsorbent" materials may also be used to carry out the purposes of the present invention. Essentially, for purposes herein, the terms are interchangeable. Moreover, it will be understood that a combination of absorbent and adsorbent materials may be used if desired in the cleaning or filtering of the air flow through the doors of the present invention.

It will be still further noted that openings may be provided in the top and bottom structural elements of a door, and in structural or other elements within the door without regard to the material out of which the door is made. The terms "rails" and "stiles" refer broadly and respectively to the top and bottom horizontal or side to side and to vertical elements of a door frame without regard to the material out of which the door is made.

Moreover, the size of the openings or holes in the rails and in the internal core elements may vary from relatively small to rather large, depending on the desired air flow and on the absorption material within the core of the door.

Finally, it will be understood that airflow through a door may vary, depending on the time of day, the relative humidity, the size of the openings in the rails and in other interior door elements, and other factors. For example, morning air it typically more humid, and the more humid air flowing through a door core may be more readily absorbed into the filtering materials than drier air. As the relative humidity decreases during the day, the drier air minus the contaminants or noxious materials is desorbed from the filtering material and flows out of the door. Contaminants, or noxious material, in the airflow through the door may still be removed from the airflow regardless of the relative humidity of the air. Furthermore, humidity itself may be absorbed by various materials.

The changes in the humidity during the day perhaps allow the removal process to be more efficient. However, air flowing through the door will be cleansed by the scrubbing material disposed within the core of the door by normal convection regardless of the humidity. The flowing air is cleansed of contaminants and noxious material from both the room and the door core internal elements, as stated above.

In addition to the removal of noxious material from an air flow through hollow core door, a hollow core door may be used to prevent the build up of air pressure in a closed room which has a forced air system. Embodiments of such hollow core door apparatus are illustrated in drawing FIGS. 7-11 and are discussed below.

Figure 7:
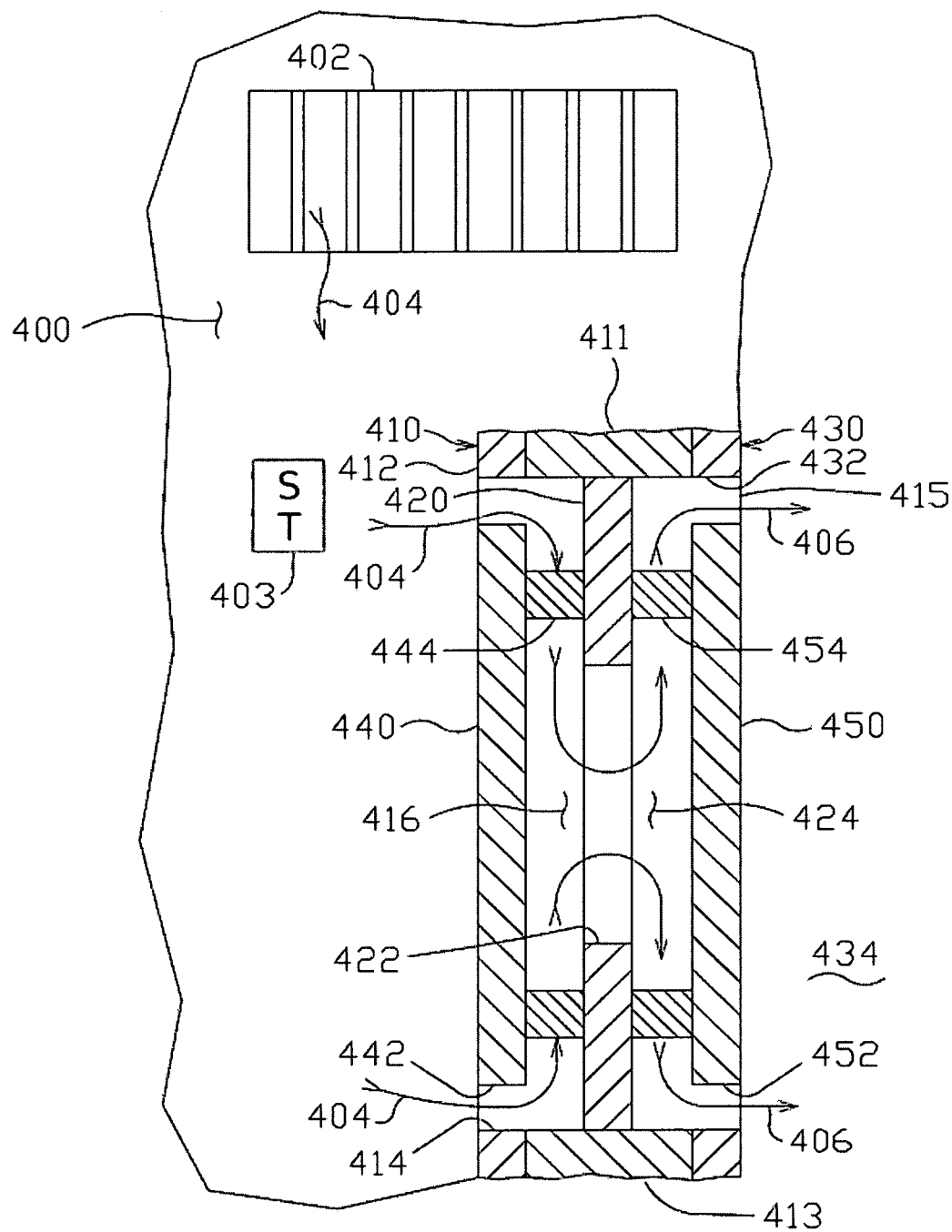
FIG. 7 is a schematic view in partial section illustrating the use environment of the apparatus of the present invention

FIG. 7 is a schematic view in partial section of a portion of a door 410 illustrating the concept of the present invention in an embodiment for preventing the build up of air pressure from a flow of air 404 flowing from a register 402 in a closed room 400.

Figure 8:
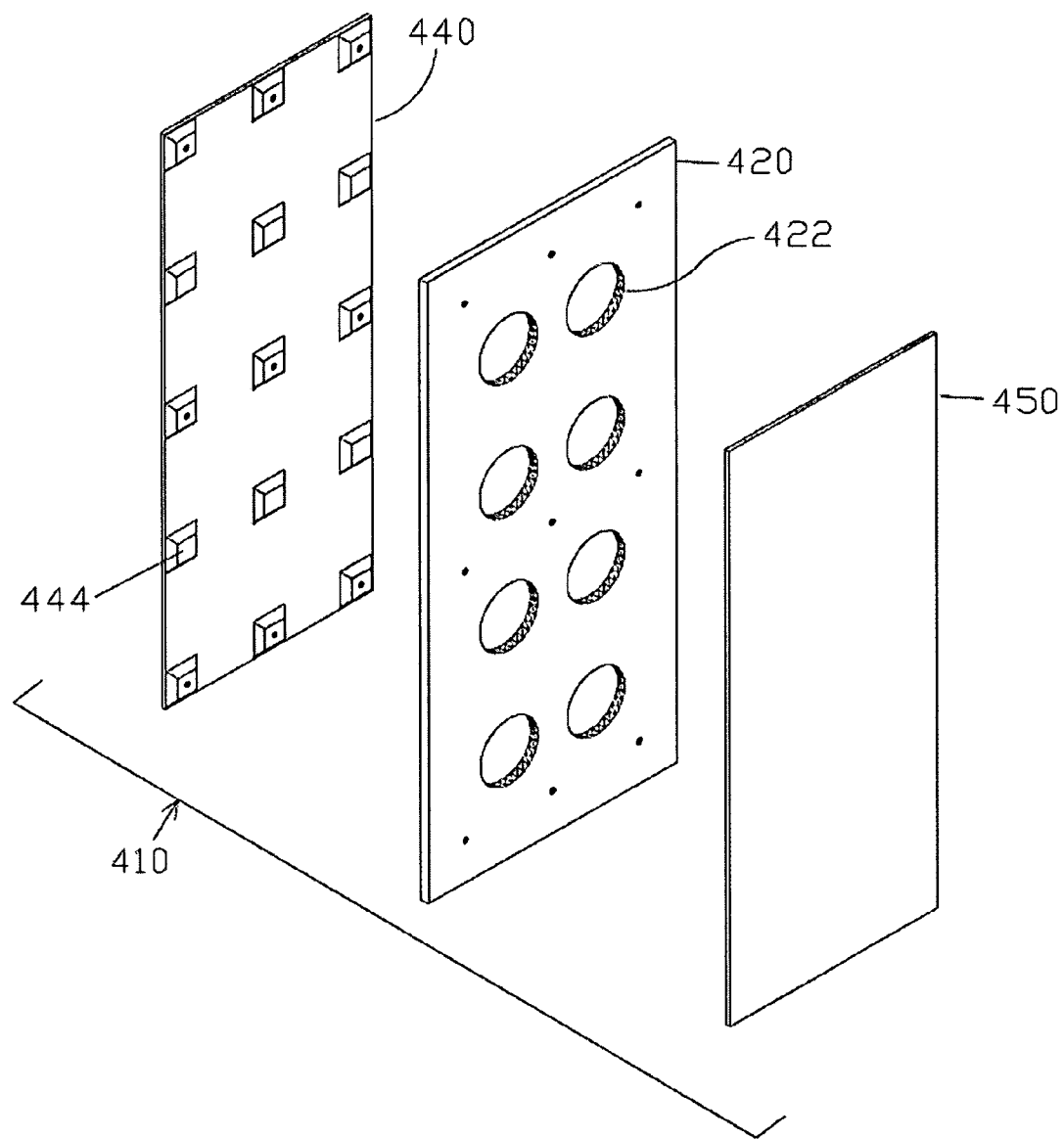
FIG. 8 is an exploded perspective view of a portion of the apparatus of FIG. 7.

FIG. 8 is an exploded perspective view of a portion of the apparatus of FIG. 7. For the following discussion, reference may be made to both FIGS. 7 and 8.

The register 402 provides a flow of air 404 into the closed room 400. Also in the room 400 is a sensor and transmitter combination 403 secured in a fixed position in the room, such as on a wall. The sensor 403 senses any desired information pertaining to the room, such as temperature, humidity, VOCs, particulates (smoke), etc., and transmits the sensed information as appropriate. This will be discussed in detail below.

The air flow into the room 400 is measured in cubic feet per minute (CFM). To prevent a build up of pressure in the room 400, the flow of air through the door 410 to a return air space 434 outside the room 400 should be proportional to the CFM flow of the inflow air 404. This will be discussed in more detail below on conjunction with the structure of the door 410.

It will be noted that in the following paragraphs the terms "inside" and "outside" refer to the room 400. The "inside" thus refers to the inside of the room 400 and the "outside" refers to the outside of the room, or the side of the door 410 which faces outwardly of the room and is in contact with the return air space 434.

Figure 14:
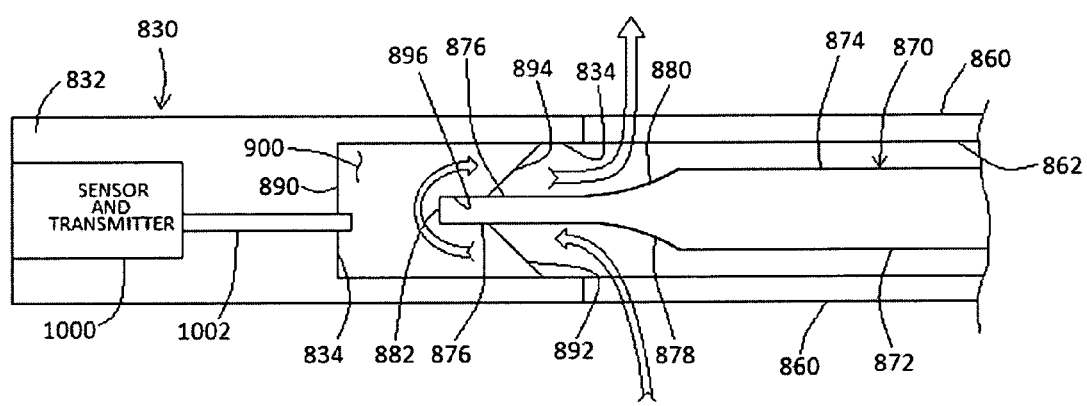
FIG. 14 is an enlarged schematic view in partial section taken generally along line 14-14 of FIG. 12.

The door 410 includes an inside door panel or skin 412 comparable to the panel 50 as may be best understood from FIGS. 3-6. The panel 412 is appropriately secured to a top rail 411 and to a horizontal bracing element 413. The top rail 411 is comparable to the top rail 16 of FIG. 5, and the element 413 is broadly comparable to the bracing element 28 of FIG. 5. A single stile 415 is shown in FIG. 14. The construction of the door 410 is typical of hollow core doors other than the air flow refinements of the air flow elements. Extending through the inside door skin 412 is an opening 414. The opening 414 may be rectangular, or circular, etc. In the opening 414 is an inner panel 440. The configuration of the panel 440 is generally the same as that of the opening 414. The air flow 404 from the register 402 flows through the opening 414 and about the inner panel 440 and into an intake air space 416.

The door 410 also includes an outside door panel or skin 430, comparable to the panel 40, as may best be understood from FIGS. 2 and 6. The door panel or skin (generally "skin" or "skins" hereafter) 430 includes an opening 432 which is generally parallel to the opening 414 and is substantially the same size as the opening 414. Disposed in the opening 432 is an outer panel 450. The outer panel 450 is generally parallel to the inner panel 440 and is substantially the same size.

Between the door skins 412 and 430 is a center panel 420. The center panel 420 includes a plurality of openings 422. Adjacent to the openings 422 on the opposite side of the center panel 420 and between the center panel 420 and the outer panel 440 is an outflow space 424. The outflow space 424 is generally parallel to the intake space 416 and is substantially the same size.

The inner panel 440 includes an outer periphery or rim 442, and the outer panel 540 includes an outer periphery or rim 452. Between the panel 440 and the center panel 420 is a plurality of spacers 444. Between the outer panel 450 and the center panel 420 is a plurality of spacers 454. The spacers 444 and 454 secure the panels 440 and 450, respectively, to opposite sides of the center panel 420, and appropriately space the center panel 420 from the inner and outer panels to define the size of the intake space 416 and the size of the outflow space 424. The spaces 416 and 424 have the same area.

It will be noted that the spacers 444 and 454 are shown in FIG. 7 as being rectangular or circular in configuration, and in FIG. 8 as being truncated pyramidal in configuration. The configuration of the spacers is immaterial; they may be of any desired or convenient configuration.

It will be noted that there are two peripheral spaces shown in FIG. 7. There is a first or inside peripheral space between the opening 414 and the rim or outer periphery 442 of the inner panel 440, and through which the air flow 404 flows into the space 416. There is a second, or outer peripheral space between the opening 432 and the rim or outer periphery 452 of the outer panel 450 through which the air flow 406 flows or passes to the return air space 434.

There is a smooth flow of air 404 from the register 402 through the peripheral space about the rim 442 of the inner panel 440 within the opening 414 into the intake space 416. The air then flows through the opening 422 in the center wall 420 to the outflow space 424 and outwardly through the peripheral space about the rim 452 of the inside panel 450 in the opening 452, and becomes an air outflow 406 to the return air space 434 outside the room 400, thus preventing the build up of air pressure in the room 400.

The peripheral spaces of the inside panel 440 and the outside panel 450 and the size or area of the openings 422 are appropriately dimensioned to provide at least the same or greater area than the peripheral spaces. The air flow 404 thus has no constraints to flowing non-linearly through the door 410 and outwardly from the room 400 into an air return space 434 outside the room 400.

Thus there is no build up of pressure within the room 400. That is, the air flow out of the room 400 through the door 410 is proportional to the CFM of the flow of air through the register 402 into the room 400. The door 410 thus prevents the build up of pressure in the room 400.

The areas through which the air flows must provide a total area proportional to the CFM of the inflow of air through the register 402. There is a relationship between the CFM of the inflow 404 and the square inches of the areas through which the air flows. For example, for a 90 CFM inflow 404, there should be an area of about 90 square inches through which the air flows through the peripheral space between the opening 416 and the rim 442 into the space 416, and there should be at least the same 90 square inches in the openings 422 for the flow of air from the space 416 into the space 424. There also should be the same 90 square inches for the air flow 406 through the peripheral space between the opening 432 and the rim 542.

The distances between the outer periphery or rim 442 and the opening 414, and between the outer periphery or rim 452 and the opening 432, are substantially the same. Those distances, and the length of the spacers 444 and 454, are dimensioned so as to provide the same CFM through the door 410 as the CFM through the register 402 of the air flow 404. That is, the spacing between the rim 452 and the opening 432 defines a peripheral space to provide the desired area for the desired air flow, and is thus equal to the peripheral space between the opening 414 and the rim 442 of the panel 440.

The square inches discussed above are the minimum areas for the CFM of the air flow through the register 402 into the room 400 and through the door 410 for the out flow 406 into the receiving space 434 to prevent any increase on the air pressure in the room 400. However, the square inches may be larger if the door permits. On the other hand, depending primarily on the thickness of the door, providing the necessary square inches for the air travel through the door may require additional elements, such as slanted panels into the air spaces 416 and 424. This will be discussed below.

In terms of pressure, professional standards generally consider that the pressure in a closed room should be less than 3 pascals, or about 0.012 inches of a water column. The present invention meets that criterion.

In FIG. 7, the panel 440 is shown disposed in the opening 414, and the panel 450 is shown disposed in the opening 432. However, it will be understood that the panels 440 and 450 will be spaced apart from their respective skins 412 and 430 in or adjacent to the openings 414 and 432, respectively, to provide the necessary peripheral spacing relative to the intake spaces 416 and 424, respectively, to provide the desired air flow.

For example, for a relatively strong air flow, in terms of CFM, and a relatively narrow door, the spacing of the panels may be outwardly from the door skins to provide the required peripheral spacing, or in a relatively weak air flow, and a relatively thick door, the panels may be disposed inwardly from the door skins. Thus, the term "adjacent" may be used to define the relationship between the door skins and their openings and the locations of the panels relative to the openings in the door skins. The term "adjacent" accordingly denotes the positioning of a panel relative to the openings in the skins in, inside, or outside, the openings.

In FIG. 8, a plurality of openings 414 are shown in the center panel 420. The total area of the openings 414 is equal to or greater than the area in square inches as discussed above.

Figure 9:
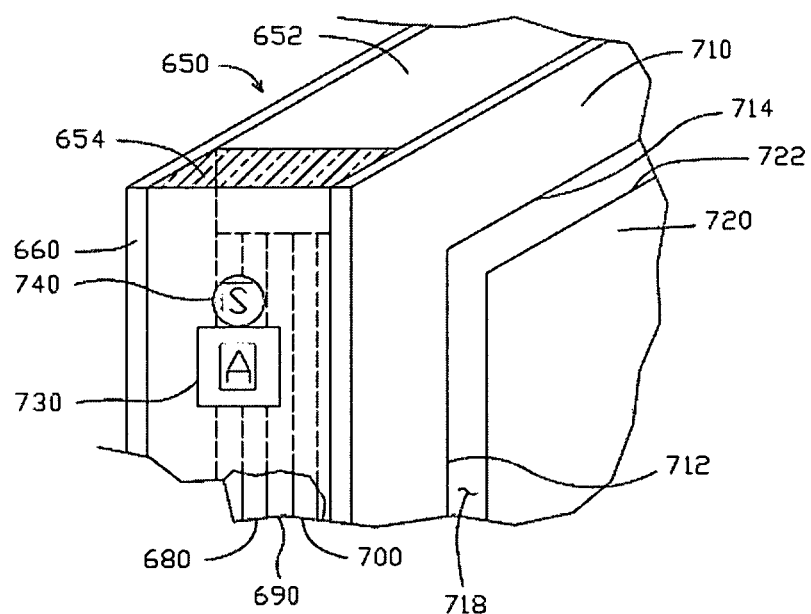
FIG. 9 is a perspective view partially broken away schematically illustrating another embodiment of the present invention.

FIG. 9 comprises a schematic fragmentary perspective view, partially broken away, of a hollow core door 650. The hollow core door 650 includes a top rail 652 secured to a stile 654. The top rail 652 and a bottom rail, not shown, the stile 654, and another stile, also not shown, comprise a conventional frame for the hollow core door 650.

The door 650 includes an inside skin 660 and an outside skin 720, both of which are shown secured to the top rail 652 and to the stile 654. The outside skin 720 includes an opening 712. The opening 712 includes an inner periphery 714. An outside panel or privacy panel 720 is disposed in the opening 712. The panel 720 includes an outer periphery 722 which is disposed in the opening 712. A peripheral space 718 is defined between the outer periphery of the panel 720 and the inner periphery 714 of the opening 712.

Within the hollow core door 650 is a pair of fixed panels 680 and 700, both of which are secured to the stile 654. A sliding panel 690 is disposed and movable between the fixed panels 680 and 700.

An actuator 730 is appropriately secured to the slidable panel 690. The actuator 730 is shown disposed within the stile 654. A sensor 740 is also disposed within the stile 654. The sensor 740 senses predetermined or desired information from the air adjacent to the door 650. Such information may include temperature, smoke particles indicative of a fire, carbon monoxide, relative humidity, or other desiderata. The sensor may provide and transmit signals in response to the desired sensed information. Signal outputs from the sensor may be sensed by the actuator 730 and by other electronic elements in the room or structure in which the door 650 is installed.

An output signal from the sensor may result in the actuator moving the slidable panel 690. Such movement may be sequential and incremental or full, as described below. Other signals may turn on or off lights, adjust blinds, etc., such as are now provided by smart phones and other electronic devices. Essentially the door 650, with the sensor 740, becomes an intelligence center for the room or structure in which the door is installed, with the ability to provide desired output signals to a wide variety of programmable electronic devices.

The actuator 730 moves the slidable panel in response to a signal from the sensor 740 or from manual signal from a user or occupant of the room in which the door 650 is installed. There is no significant flow of air through the door 650 when the openings in the sliding panel 690 are out of alignment with the openings in the fixed panels 680 and 700. With a programmable sensor 740, the movement of the panel 690 may be set to incrementally move the panel 690 in response to a temperature change, or other criteria, to a full closing or misalignment of the openings in the fixed and movable panels, or to a full opening by a full alignment of the openings in the three panels.

A full closure or non-movement of air through the door 650 by complete non-alignment or blockage of alignment of the openings in the fixed and movable panels may also be obtained by the sensing of a fire by the sensor 740. Such full closure or blockage provides three panels on the interior of the hollow core door 650. The additional fire resistance may provide additional time for occupants to evacuate the structure in which the door/doors is/are installed. The full non-alignment of the openings in the panels 680, 690, and 700 may also restrict the availability of air or oxygen to a fire in the room.

As stated above, the programmable functions available in contemporary electronics make the door 650 a "smart door" with many capabilities. The location of the sensor 740 in a stile at an appropriate height allows the sensing of information whether the door 750 is open or closed, or anywhere in between, and the sensing is to a more accurate extent than that of a fixed sensor on a wall or on a ceiling. However, in combination with fixed wall or ceiling mounted sensors, such as the sensor 403 of FIG. 7, comparative information from the sensors provides the most accurate information as to the air quality in a room.

Thus, a plurality of "smart doors" in a structure, in addition to fixed sensors, provides more accurate and more complete information relative to individual rooms and halls than contemporary fixed wall or ceiling sensors may provide. However, it will be noted that a sensor need not be installed as shown. If desired, a sensor may be installed in any desired of appropriate location in a room or in a door, as discussed below. Nevertheless, the advantages of the sensor installed in the door appear to be preferable to a wall or ceiling installation.

The full pressure build up prevention capabilities of the embodiments of FIGS. 7 and 8, and the scavenging or scrubbing properties of the embodiments of FIGS. 1-6, may be included in the embodiment of the "smart door" of FIG. 9, thus providing multiple capabilities and benefits.

Figure 10:
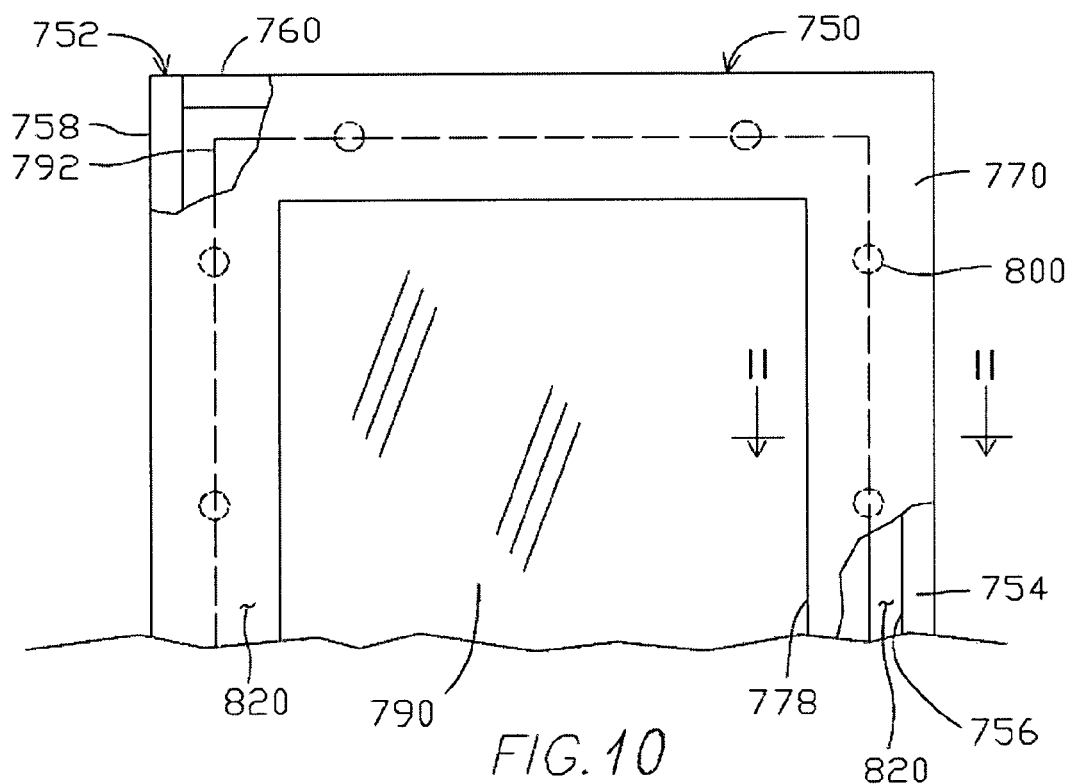
FIG. 10 is a fragmentary front view, partially broken away, of another embodiment of the present invention.
Figure 11:
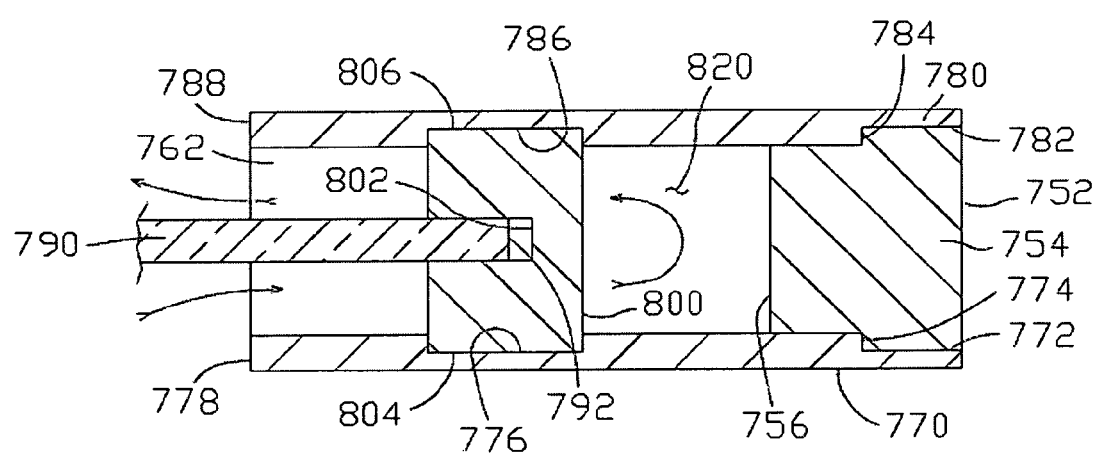
FIG. 11 is an enlarged schematic view in partial section taken generally along line 11-11 of FIG. 10.

The non-linear flow of air may be provided in another embodiment, a third generation hollow core door 750, illustrated in FIGS. 10 and 11. There is less privacy with the door 750, but there is greater air flow through the door 750.

FIG. 10 is a partial front view of a portion of the hollow core door 750 having a non-linear flow of air through the door. Portions of the door 750 are broken away to shown structural and other features of the door. FIG. 11 is a view in partial section of a portion of the door 750 taken generally along line 11-11 of FIG. 10. The door 750 includes a fixed center panel disposed between the inside and outside skins. For the following discussion of the door 750, reference may be made to both FIGS. 10 and 11.

It will be noted that the terms "inside" and "outside" are used with respect to the door 750 as set forth above with respect to the doors 410 and 650.

The door 750 includes a conventional hollow core door perimeter frame 752, including a pair of stiles 754 and 758 and a pair of rails 760 and 762 appropriately secured together. The stile 754 has an end face 756, shown in FIG. 30.

An inside skin 770 is secured to the frame 752. The inside skin 770 includes a rabbet 772 and a shoulder 774 at the end of the rabbet 772. A mating shoulder of the stile 754 is disposed against the shoulder 774. The inside skin 770 also includes a recess or bore 776, and an opening 778. The opening 778 frames a fixed center panel 790. The opening 778 is shown as rectangular in FIG. 29, but may be any desired configuration to conform to a panel which is generally centered or framed by the opening 778. The opening 778, as best may be understood from FIG. 29, defines an inner periphery for framing the panel 790.

The panel 790 is illustrated as being generally rectangular as indicated by dotted line in FIG. 10. The panel 790 includes an outer periphery 792. The opening 778, or its inner periphery, is smaller than the outer periphery 792 of the panel 790. The area between the inner periphery of the opening 778, and of a like opening 788 in an outside skin 780, and the outer periphery 792 of the panel 790, defines a perimeter portion of the door 750 where the panel is secured to the inside and outside skins, as discussed below and as shown in FIG. 11.

The outside skin 780 includes a rabbet 782 with a shoulder 784 against which a mating shoulder of the stile 754 is disposed. The outside skin 780 also includes a recess or bore 786 aligned with the bore 766 of the inside skin 770. The opening 788 is aligned with the opening 778 of the inside skin 770. The recesses or bores 776 and 786 are also aligned with each other.

The inside skin 770 and the outside skin 780 are mirror images of each other, and they frame the panel 790. The panel 790 is disposed between and spaced apart from the two skins.

The center panel 790 is secured to the inside and outside skins 770 and 780, respectively, by spaced apart support blocks 800. In FIG. 10, the support blocks 800 are shown in dotted line spaced apart for supporting the panel 790. The recesses 766 and 786 in the skins 760 and 780 receive the support blocks 800. As may be understood from FIG. 29, there are a plurality of spaced apart and aligned recesses or bores 776, 786 for receiving a plurality of support blocks 800.

The support blocks 800 include recesses or slots 802. The recesses or slots 802 extend inwardly from the support blocks 800 and receive the outer periphery 792 of the panel 790 to secure the panel between the inside and outside skins. The recesses 802 of the support blocks 800 secure the panel 790 to the support blocks 800, and the support blocks 800 hold the panel 790 a predetermined distance or spacing from the skins 770 and 780. The support blocks 800 extend outwardly from their recesses in the skins to as to provide a space for air flow between the panel 790 and the adjacent skins. This is clearly shown in FIG. 11. The support blocks 800 include ends 804 and 806 which extend into the recesses or bores 776 and 786 of the inside and outside skins 770 and 780, respectively.

With the panel 790 secured to and disposed between the skins 760 and 780 by the support blocks 800 and their recesses 802, respectively, and with and the skins 760 and 780 secured to the frame 752, the door 750 is complete.

A chamber 820 is defined between the skins 760 and 780 and the end 756 of the stile 754 and above the bottom rail 762, as shown in FIG. 30. The chamber 820 extends about the outer periphery 792 of the panel 790 and within both stiles and both rails, as may be understood from FIG. 10.

The airflow around the panel 790 is illustrated by the arrows in FIG. 30 into and out of the chamber 820, and thus through the door 750 from a room to the outside of the room, as discussed above for the previous embodiments of the pressure build up prevention doors. The airflow is non linear, as with the previous embodiments, to prevent pressure build up in a room, and to provide a degree of privacy with respect to both light and sound.

With the relatively large peripheral length around the entire perimeter or outer periphery of the center panel 792 for the chamber 820, there is more than adequate area for air flow through the door 750 to prevent pressure build up in a room in which the door 750 is located.

It will be noted, as best understood from FIG. 11, that the thickness of the panel 790 essentially controls the air flow into and out of the chamber 820. The thickness of the panel, preferably centered between the inside and outside skins, determines the spacing between the panel and the adjacent interior walls of the respective skins. As indicated, the panel 790 is hatched for glass, and thus is shown as a fixed width. If the panel 790 were to be wood, mdf, etc., it could be tapered in the area of the openings 778 and 788 of the skins, and thus vary the flow of air into and out of the chamber 820 from a predetermined amount based solely on the fixed thickness of the panel.

While the center panel 790 is hatched for transparent material in FIG. 11, it will be understood that any type of material may be used for the panel. The center panel may also have a different configuration than shown, and may be of any appropriate size. Moreover, there may be other ways to secure the center panel to the skins than that shown in FIG. 11.

As with the other pressure build up prevention doors discussed above, scrubbing elements or materials may be added to the door 750 for the removal of noxious material from the air flow through the door.

A stile and rail door may also be used to prevent the pressure build up in a closed room by providing hollow core stiles and rails for the door frame. A panel, or panels, may be secured within the hollow core stiles and rails so that air flow is through the door about the panel or panels in a non linear manner and outwardly from the room.

Figure 12:
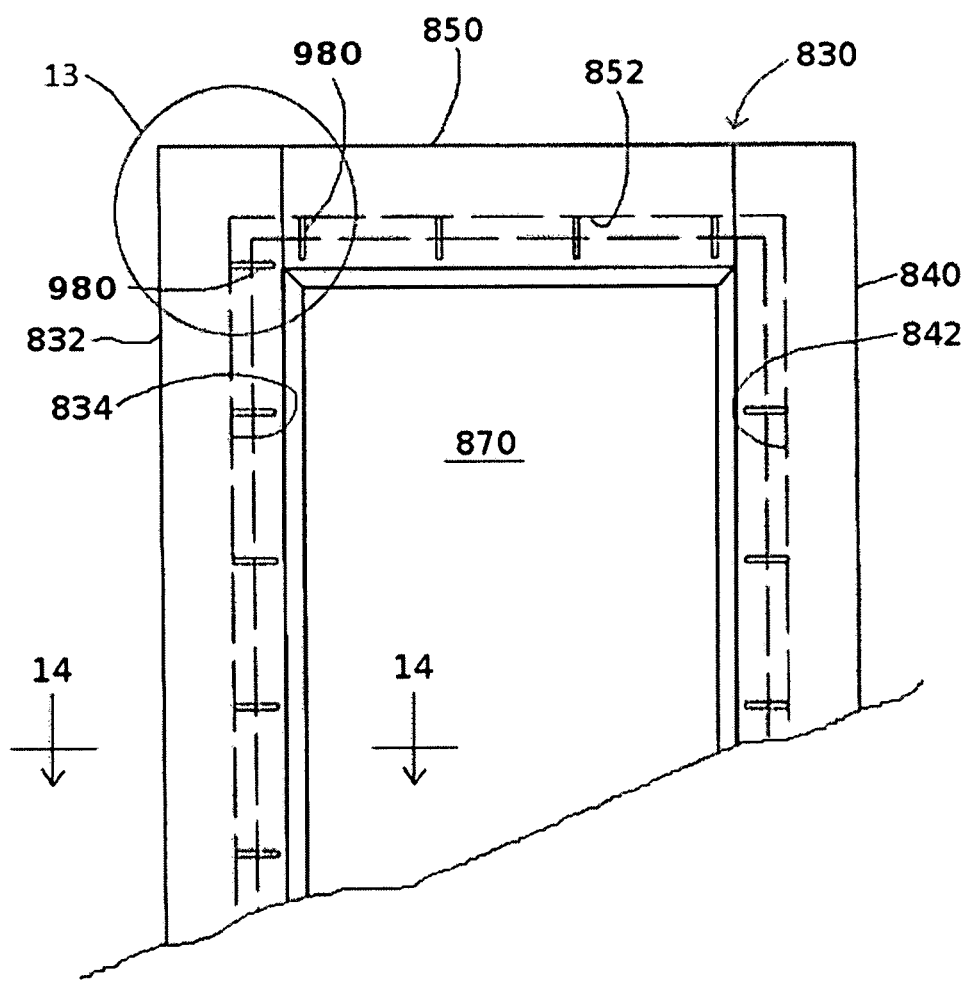
FIG. 12 is a fragmentary view, partially broken away, of the apparatus of the present invention.
Figure 13:
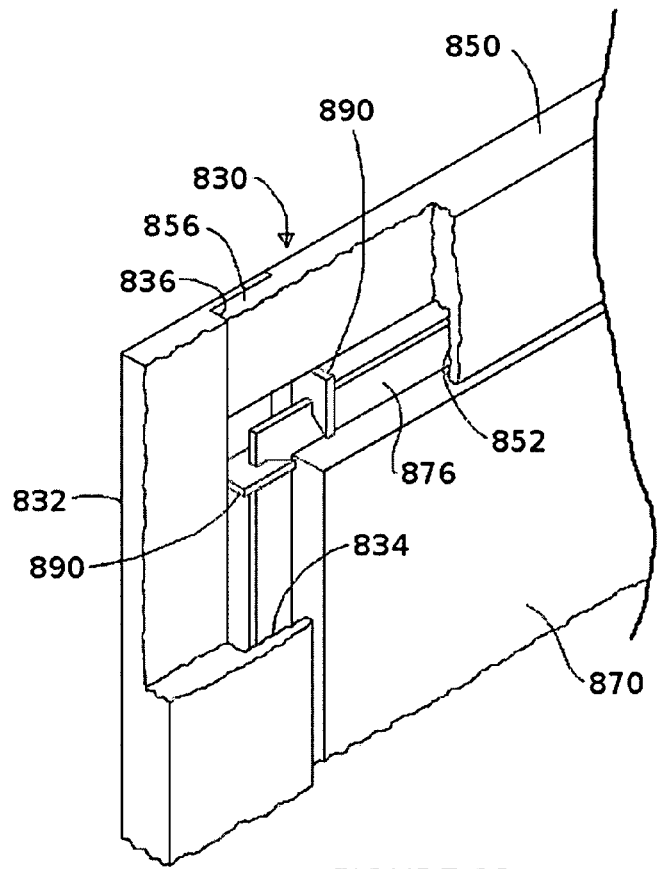
FIG. 13 is a perspective view in partial section of a portion of the apparatus of the present invention taken generally from circle 13 of FIG. 12.

FIG. 12 is a partial front view of a stile and rail door embodiment 830 of the present invention. FIG. 13 is a fragmentary perspective view, in partial section, of a corner portion of the door 830, taken generally from circle 13 of FIG. 12. For the following discussion, reference may be made to both FIGS. 12 and 13.

It will be noted that the terms "inside" and "outside" are again used as discussed above with reference to the rooms and the doors for the rooms to which the doors are secured. Thus the air flow into the room in which the door 830 is secured contacts the inside of the door 830 and flows to the outside of the room through the door 830 for preventing a build up of pressure in the room, in a manner as shown for the doors discussed above.

The door 830 is a stile and rail door, with the stiles and rails modified to provide hollow cores in the stiles and rails, and a panel, having an inside face and an outside face and an outer perimeter. The panel is secured within the hollow cores of the stiles and rails to allow air flow into chambers defined by the hollow cores of the stiles and rails about the outer perimeter of the panel and out of the chambers and outwardly from a room in which the door is secured. In FIG. 12, a single aligned chamber is illustrated within the hollow core stiles 832 and 840 and top rail 850.

The air flows by the inside face of the panel and into the chambers, about the outer perimeter of the panel, and out of the chambers and by the outside face of the panel and thus outwardly from the closed room to which the door is secured.

The door 830 includes a pair of stiles 832 and 840, and a top rail 850 is shown secured to the stiles 830 and 840 by conventional tongue and groove construction. In the alternative, cope and stick construction or other appropriate construction methods may be used, as desired. The stile 832 includes a recess or slot 834, and the stile 840 includes a recess or slot 842. The slots 834 and 842 define hollow cores for the respective stiles.

The door 830 also includes a pair of rails, a top rail 850, and a bottom rail 860 (see FIG. 14). The top rail 850 includes a slot includes a slot 852, and the bottom rail 860 includes a slot 862 (see FIG. 14). The slots 852 and 862 define the hollow cores for their respective rails. The tongue and groove construction is also shown in FIG. 13 by a groove 836 and a tongue 856.

A panel 870 is shown in FIG. 12 secured to the stiles 832 and 840 and to the rail 850 by a plurality of support elements 890. The support elements 890 are shown disposed in the slots 834 and 842 of the stiles 832 and 840, respectively, and in the slot 852 of the rail 850. The panel 870 includes a tapered tongue or flange 876 extending about the outer periphery of the panel 870. The tongue or flange 876 is shown disposed in the support elements 890.

FIG. 14 is a schematic view of a portion of the door 830 taken generally along line 14-14 of FIG. 12. Reference may be made to FIG. 14 in addition to FIGS. 12 and 13 for the following discussion.

The panel 870 includes an inside face 872 and an outside face 874. The flange 876 extends about the outer perimeter of the panel 870, and extends into support elements 890. The tongue or flange 876 has a reduced thickness relative to the thickness of the panel 870 for matingly engaging the support elements 890, and for providing a relatively smooth air flow about the panel 870, as discussed below.

Disposed within the hollow cores of the stiles and rails are the support elements 890. The support elements 890 are spaced apart about the outer perimeter of the panel 870 for providing appropriate support for the panel 870 within the chambers defined by the hollow cores of the stiles and rails of the door 830.

A plan view of a support element 890 is shown in FIG. 14, supporting a portion of the panel 870. The support element 890 includes a pair of oppositely inwardly extending inside and outside tapers 892 and 894, respectively. The tapers 892 and 894 extend to a recess 896. The recess 896 terminates in a flat end. The flange 876 of the panel 870 extends into the recess 896, with an end 882 of the tongue or flange 876 disposed against the end of the recess 896. The support elements 890 are appropriately secured within the hollow cores.

The panel 870 includes an inside face 872 and an outside face 874. The panel 870 also includes the tongue or flange 876 extending about the panel 870. The flange 876 includes tapering portions 878 and 880 extending from the faces 872 and 874, respectfully. The tapers 878 and 880 reduce the thickness of the flange 876 relative to the thickness of the panel 870. The flange 876 terminates in the outer end 882 at the outer perimeter of the panel 870.

The flange 876 is disposed within the recesses 896 of the support elements 890, with the end 882 of the panel 870 disposed at the inner ends of the slots 896 of the elements 890. Thus, the spaced apart support elements 890 secure the flange 876 of the panel 870 within the hollow cores of the stiles 832, 840 and rails 850 and 860.

A chamber 900 is defined within the aligned slots or hollow cores of the stiles and rails and about the flange 876. As shown in FIG. 14 by the double lined arrows about the flange 876, air flows along or about the inside face 872 of the panel 870 and into the chamber 900, around the end 882 of the tongue or flange 876, out of the chamber 900, and along or about the outside face 874 of the panel 970 and out of the room in which the door 830 is secured.

The chamber 900, defined by the hollow cores of the stiles and rails into which the air flows through the door 830, to provide the same pressure build up prevention as the air flows through the hollow core door 750, shown in FIGS. 10 and 11, discussed above. The structure is different, but the same function is provided. The air flows from the room, as from the room 400 of FIG. 7, around the outer periphery 876 of the panel 870, into the chamber 900, and from the chamber 900 outwardly from the room as shown by the double arrows. The room air thus flows through the stile and rail door 830 outwardly from the room to prevent the build up of pressure in the room. The flow of air through the door is non linearly to provide a degree of privacy with respect to both light and sound. The non linearity is illustrated by the at least five changes of direction in the flow of air through the door 830.

It will be noted that the structure of the hollow core door 410 of FIGS. 7 and 8 is also different than the structure of the hollow core stile and rail door 830, but the air flow through the doors is similar in that pressure build up in a closed room is prevented.

It will be noted that the door 830 has been illustrated as having the hollow core stiles and rails continuously. However, it may not be necessary to have the hollow cores continuously, depending on the air flow into a room as discussed above. The appropriate air flow measurements will determine the extent of the hollow cores, as discussed above with respect for a determination of the area required for the appropriate air flow in the various embodiments of structures for preventing the build up of pressure in a closed room.

The principles illustrated and discussed for the door 830 may be applied to door having more than top and bottom rails, and thus more than one panel. One or more intermediate rails may be secured to the stiles, with the intermediate rails including slots around their outer peripheries to define hollow core rails through which air may flow about panels appropriately supported in the hollow cores of the stiles and rails.

Figure 15:
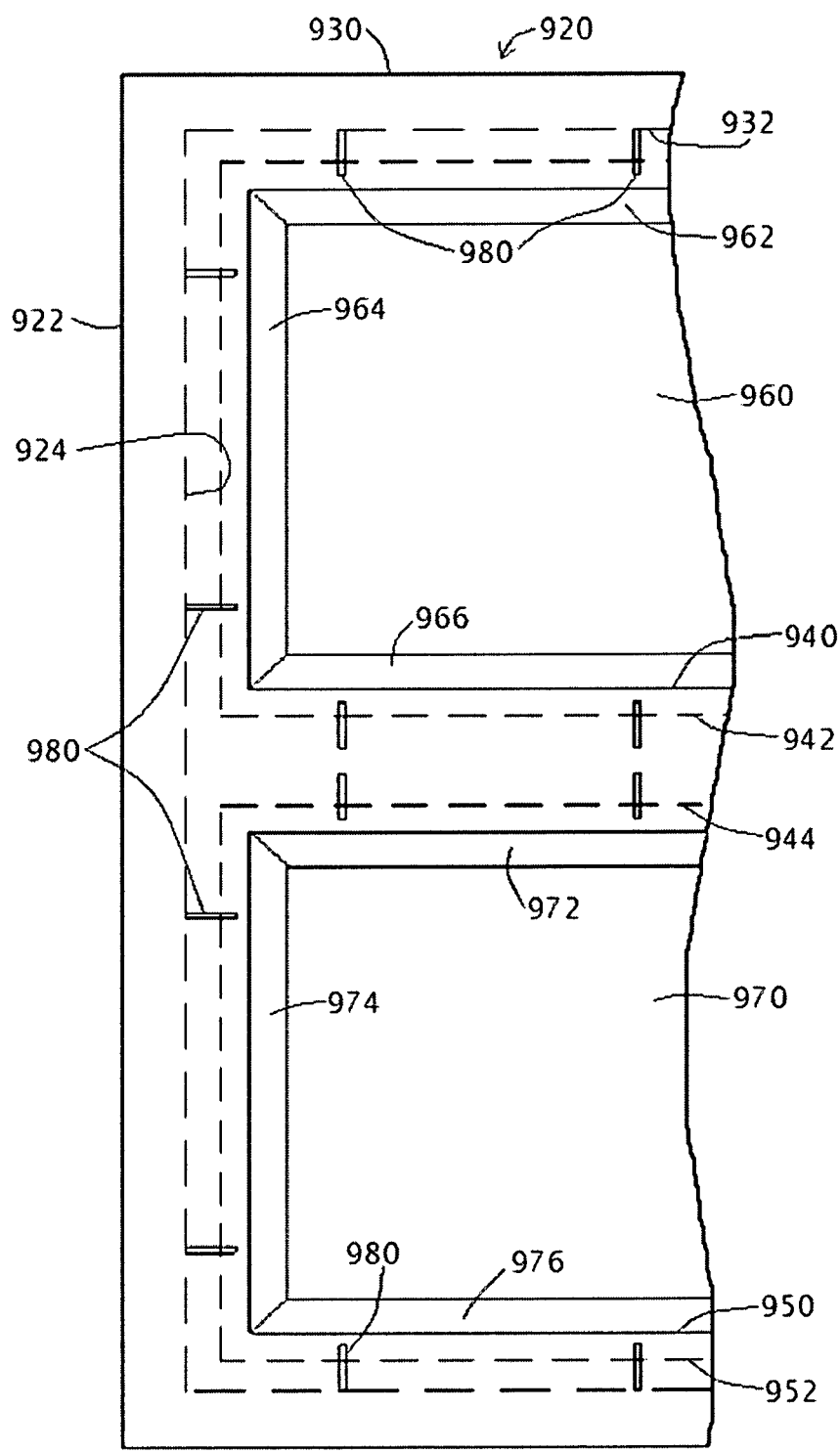
FIG. 15 is a plan view of an alternate embodiment of the present invention.

FIG. 15 is a plan view schematically illustrating a stile and rail door 920 with an intermediate rail 940, and thus two panels, an upper panel 960 and a lower panel 970. The door 920 includes two stiles, of which only a stile 922 is shown and a top rail 930 appropriately secured to the stiles. The intermediate rail 940 is also appropriately secured to the stile 922 and its parallel stile, not shown.

The stile 922 includes a slot 924. The slot 924 comprises a hollow core in the stile. Secured to the stile 922 is an upper or top rail 930 and a lower of bottom rail 950. The rail 930 includes a slot 932 and the rail 950 includes a slot 952. The rails 930 and 950 are hollow core rails, with the slots defining hollow cores aligned with the hollow core slot 924 of the stile 922 and the hollow core slot of a second stile, not shown. Again, the stiles and rails are secured together conventionally, as discussed above.

The upper panel 960 includes four tongues or flanges 962, 964, 966, and a fourth tongue or flange not shown, at the outer perimeter of the panel 960.

The tongues or flanges 962 and 964 extend into spacers 980 in the hollow cores 932 and 924, respectively. The spacers 980 may be substantially identical to the spacers 890 of the door 830. The spacers 980 appropriately support the tongues or flanges within the hollow cores to allow for the flow of air through the hollow cores.

The intermediate rail 940 includes a top slot or recess 942 and a bottom slot or recess 944. The recesses 942 and 944 are shown as hollow core recesses for air flow through the rail 940. However, the flange 966 may extend fully into the recess 942 if the recess is not configured as a hollow core recess. Thus no air flows around the top of the intermediate rail 940 if the recess or slot 942 is not configured as a hollow core recess. The same is true of the bottom recess 944. The recess 944 is shown as a hollow core recess if it is desired to have air flow through the bottom of the intermediate rail 940. The intermediate rail 940 includes flanges at its outer ends which extend into the slots of the stiles, such as the slot 924 for securing the intermediate rail to the stiles.

For extra strength in the center portion of the door 920, and when the perimeter air flow through the stile 922 and it parallel stile, not shown, and the top rail 930 is sufficient, the intermediate rail 940 may not have its slots or recesses 940 and 944 configured as hollow cores. The flange 966 of the top panel 960 and the flange 972 of the bottom panel 970 simply extend into the non hollow core slots or recesses 940 and 944 of the top panel 960 and the bottom panel 970, respectively.

The lower panel 970 includes outer peripheral tongues or flanges 972, 974, 976, and a fourth flange, not shown. The tongue or flange 972 extends into the bottom slot 944 of the intermediate rail 940 without a spacer unless the slot is configured as a hollow core. If the slot is not configured as a hollow core, there will be no air flow around the flange 972, as discussed above for the tongues or flanges 966 and the slot 842. The slots 942 and 944 are shown in FIG. 15 as hollow cores, with spacers securing the flanges 966 and 972 in the hollow core slots.

The flanges 974 and 976 extend into the hollow core slot 924 of the stile 922 and into the hollow core slot 952 of the bottom rail 950, respectively. Spacers 980 secure the flanges into the slots as discussed above.

If more air flow through the door 920 is desired, the top and bottom slots 942 and 944 in the intermediate rail 940 may be configured to define hollow cores, as discussed, and the air flow about the outer perimeters of the panels 960 and 970 may thus be continuous.

The hollow cores in the stiles and rails define chambers into and out of which air flows about the outer perimeters of the panels. The outer perimeters of the panels are disposed in the chambers by the spacers to allow air to flow around the outer perimeters. Air flow is thus along the inside faces of the panels, into the chambers, around or about the outer perimeters, out of the chambers, and along the outside faces of the panels and out of the room through the door.

The air flow requirements of a room determine the spacing widths of the flanges and the size of the hollow cores, and the number of hollow cores required for a specific door. For example, FIG. 15 shows hollow cores in all of the stiles and rails, of both panels, but such may not needed. Thus, for some applications both the top and bottom slots in the intermediate rail need not be hollow cores for air flow. Or one slot may be required for a hollow core, depending on the specific air flow requirements. In that case, either the top or the bottom slot may be configured into a hollow core, as desired.

The desired perimeter air flow about a panel or panels determines the need for the hollow cores. Moreover, the size of the hollow cores may be varied in accordance with air flow requirements. The present invention provides a hollow core stile and rail door with perimeter air flow about panels secured to the hollow core stiles and rails to prevent the build up of pressure in a closed room having a forced air system, and provides privacy in terms of both light and sound by the non linear flow of air through the door.

Returning to FIG. 14, a sensor/transmitter 1000 is shown in the stile 832. The sensor/transmitter 1000 includes a probe 1002 extending into the chamber 900. The sensor may be configured to sense any desirable information, such as temperature, humidity, occupancy, VOCs, smoke particulates, carbon monoxide, radon, etc. The information sensed may be transmitted to appropriate receivers, servos, etc. The door 830 thus may be considered a smart door, such as the door 850.

With sensors in every room, a fixed sensor in one part of a room and another sensor in a door, and every room in a home thus equipped, and with the sensed information transmitted to a computer, the cloud, or to a smart phone, the status of the air in each room then notes any anomaly. The anomaly is noted and then appropriate action may be taken.

The sensed information comes from static sensors in a room and from sensors with probes in the air flow through a door, as shown in FIG. 14. The sensed information pinpoints not only the potential problem, but provides the specific location of the potential problem. For example, sensors showing higher than normal humidity in a bathroom may indicate a problem. The specific bathroom is noted. A high radon reading in one part of a house may indicate a radon leak, and the location of the leak or source is noted. The same situation may occur with VOCs noted in a specific room. These are just a few examples of the possibilities of the apparatus of the present invention combined with static sensors in room.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. For example, two types of door have been shown, a single panel door and a two panel door. If desired, a door may have more than two doors, using the same air flow as illustrated and discussed. The appended claims are intended to cover and embrace any and all such modifications, within the limits only of the true spirit and scope of the invention.

What I claim is:

1. A stile and rail door for preventing the build up of pressure in a closed room having a forced air system providing a flow of air comprising in combination:
   a door frame including pair of stiles and a pair of rails disposed between the pair of stiles;
   hollow cores in the pair of stiles;
   chambers defined within the hollow cores of the pair of stiles;
   a first plurality of support elements disposed in the chambers of the hollow cores of the pair of stiles; and
   a panel having
      an inside face,
      an outside face,
      an outer perimeter secured to the plurality of support elements in the chambers in the pair of stiles, and the outer perimeter is secured to the rails, whereby air flow from the forced air system flows through the door by flowing around the inside face of the panel and into the chambers in the pair of stiles, about the outer perimeter of the panel in the chambers of the pair of stiles, from the chambers and about the outside face of the panel and outwardly from the room in a non linear manner.

2. The stile and rail door of claim 1 in which the outer perimeter of the panel includes a flange extending from the outer perimeter in the hollow cores of the pair of stiles to the inside and outside faces of the panel and the first plurality of support elements is secured to the flange.

3. The stile and rail door of claim 1 in which the pair of rails includes a top rail and a bottom rail secured to the pair of stiles, and one of the rails includes a hollow core defining a chamber in the one of the rails, and the chamber in the one of the rails is aligned with the chambers in the pair of stiles, and the outer perimeter of the panel is secured in the chamber in the one of the rails by a second plurality of spacer elements, whereby the flow of air from the forced air system also flows into the chamber in the one of the rails, around the outer perimeter of the panel in the chamber in the one of the rails and out of the chamber in the one of the rails and out of the room in a non linear manner.

4. The door of claim 3 in which the outer perimeter of the panel disposed in the hollow core of the one of rails includes a flange extending from outer perimeter of the panel in the chamber in the one of the rails to the inside and outside faces of the panel, and the second plurality of spacer elements is secured to the flange in the chamber in the one of the rails.

5. The stile and rail door of claim 3 in which the other rail of the pair of rails includes a hollow core defining a chamber in the other of the rails, and the outer perimeter of the panel is secured in the chamber in the other of the rails by a third plurality of spacer elements, whereby the flow of air from the forced air system also flows in the chamber in the other of the rails, around the outer perimeter of the panel in the other of the rails and out of the chamber in the other of the rails and out of the room in a non linear manner.

6. The stile and rail door of claim 5 in which the outer perimeter in the chamber in the other of the rails of the pair of rails includes a flange extending outwardly from the outer perimeter to the inside and outside faces, and the third plurality of spacer elements is secured to the flange in the chamber of the other of the rails.

7. The stile and rail door of claim 1 in which the panel has a first width and a flange at the outer perimeter, and the flange has a second width which is less than the first width, and the flange extends into the first plurality of spacer elements.

8. The stile and rail door of claim 1 which includes sensor elements for sensing information.

9. The stile and rail door of claim 8 which further includes a transmitter for transmitting the sensed information.

10. A hollow core stile and rail door for preventing pressure build up in a closed room having a forced air system for providing a flow of air comprising in combination:
 a door frame including a pair of spaced apart hollow core stiles;
 a top rail disposed between and secured to the pair of hollow core stiles;
 a slot in the top rail;
 a bottom rail disposed between and secured to the pair of hollow core stiles;
 a slot in the bottom rail;
 a first chamber defined within one stile of the pair of hollow core stiles;
 a second chamber defined within the other stile of the pair of hollow core stiles;
 a panel having an inside face and an outside face;
 an outer perimeter on the panel disposed in the first and second chambers and in the slots in the top and bottom rails, and the outer perimeter extending into the first and second chambers includes ends and flanges extending from the ends to the inside and outside faces; and
 a first plurality of support elements secured to the pair of hollow core stiles in the first and second chambers and to the flanges of the outer perimeter for securing the panel to the pair of hollow core stiles, whereby air flows along the inside face of the first panel and into the first and second chambers and around the outer perimeter of the panel in the first and second chambers and along the outside face of the panel and outside the door in a non linear manner.

11. The hollow core stile and rail door of claim 10 in which the slot in the top rail comprises a hollow core in the top rail defining a third chamber and the outer perimeter of the panel extends into the third chamber, and the outer perimeter of the panel in the third chamber includes an end and a flange extending from the end to the inside and outside faces; and a second plurality of spacer elements secured to the top rail in the third chamber of the top rail and to the flange of the outer perimeter of the panel in the third chamber, whereby air flows about the inside face of the panel, into the chamber of the top rail, about the end of the outer perimeter and out of the third chamber and along the outside face and outwardly from the room in a non linear manner.

12. The hollow core stile and rail door of claim 11 in which the bottom rail includes a hollow core defining a fourth chamber and the outer perimeter of the panel in the fourth chamber includes an end and a flange extending from the end to the inside and outside faces of the panel, and a third plurality of spacer elements is secured to the bottom rail in the fourth chamber and to the flange of the outer perimeter of the panel in the fourth chamber, whereby air flows about the inside face of the panel, into the fourth chamber, about the end, and out of the fourth chamber and along the outside face of the panel and outwardly from the room in a non linear manner.

13. A hollow core stile and rail door for preventing pressure build up in a closed room having a forced air system for providing a flow of air comprising in combination:
 a first stile;
 a second stile;
 a top rail;
 a bottom rail;
 a slot in the first stile to provide a first hollow core stile and defining a first chamber;
 a slot in the second stile to provide a second hollow core stile and defining a second chamber;
 a slot in the top rail to provide a hollow core rail and defining a third chamber;
 a slot in the bottom rail to provide a hollow core rail and defining a fourth chamber;
 an intermediate rail disposed between the top and the bottom rails and having outer ends extending into the first and second chambers to secure the intermediate rail to the first and second stiles;
 a first panel having an inside face and an outside face disposed between the top rail and the first and second stiles and the intermediate rail, and the first panel includes an outer perimeter disposed in the first, second, and third chambers;
 a first plurality of spacer elements to secure the outer perimeter of the first panel in the first, second, and third chambers, whereby air flows along the inside face of the panel, into the first and second and third chambers, about the outer perimeter of the first panel, along the outside face and outwardly from the room in a non linear manner.

14. The hollow core stile and rail and door of claim 13 in which the intermediate rail includes a top slot, the outer perimeter of the first panel extends into the top slot.

15. The hollow core stile and rail door of claim 14 in which the top slot in the intermediate rail defines a fifth chamber, and the outer perimeter of the first panel is secured in the fifth chamber by a second plurality of spacer elements, whereby air flows along the inside face of the first panel, into the fifth chamber, about the outer perimeter of the first panel, out of the fifth chamber, along the outside face of the first panel, and outwardly from the room in a non linear manner.

16. The hollow core stile and rail door of claim 15 which further includes a second panel disposed between the first and second stiles, the bottom rail, and the intermediate rail, and the intermediate rail includes a bottom slot, and the second panel includes an inside face and an outside face.

17. The hollow core stile and rail door of claim 16 in which the second panel includes a outer perimeter extending into the first and second and fourth chambers, and into the bottom slot of the intermediate rail.

18. The hollow core stile and rail door of claim 17 which further includes a third plurality of spacer elements to secure the outer perimeter of the second panel in first, second, and fourth chambers, whereby air flows along the outside face of the second panel, into the first, second, and fourth chambers, around the outer perimeter of the second panel, along the outside face, and outwardly from the room in a non linear manner.

19. The hollow core stile and rail door of claim 18 in which the bottom slot in the intermediate rail defines a sixth chamber, and the outer perimeter of the second panel is secured in the sixth chamber by a fourth plurality of spacer elements, whereby air flows along the inside face of the second panel, into the sixth chamber, about the outer perimeter of the second panel, out of the sixth chamber, along the outside face of the second panel, and outwardly from the room in a non linear manner.

20. The hollow stile and rail door of claim 19 in which the first and second panels have a first width, and their outer perimeters include flanges having a second width which is less that the first width, and the flanges of the first and second panels are secured in the first, second, third, fourth, fifth, and sixth chambers by the first, second, third, and fourth pluralities of spacer elements.

* * * * *